(12) United States Patent
Frauenfelder

(10) Patent No.: US 12,017,869 B2
(45) Date of Patent: Jun. 25, 2024

(54) DEVICE FOR CONVEYING BULK MATERIALS

(71) Applicant: Martin Frauenfelder, Bern (CH)

(72) Inventor: Martin Frauenfelder, Bern (CH)

( * ) Notice: Subject to any disclaimer, the term of this patent is extended or adjusted under 35 U.S.C. 154(b) by 218 days.

(21) Appl. No.: 17/753,377

(22) PCT Filed: Sep. 18, 2020

(86) PCT No.: PCT/EP2020/076163
§ 371 (c)(1),
(2) Date: Mar. 1, 2022

(87) PCT Pub. No.: WO2021/053176
PCT Pub. Date: Mar. 25, 2021

(65) Prior Publication Data
US 2022/0297953 A1      Sep. 22, 2022

(30) Foreign Application Priority Data

Sep. 18, 2019   (CH) ..................... 01193/19

(51) Int. Cl.
| | | |
|---|---|---|
| *B65G 47/90* | (2006.01) | |
| *B23B 31/107* | (2006.01) | |
| *B65G 27/32* | (2006.01) | |
| *B65G 43/08* | (2006.01) | |
| *B65G 47/14* | (2006.01) | |

(52) U.S. Cl.
CPC ............ *B65G 47/90* (2013.01); *B23B 31/107* (2013.01); *B65G 27/32* (2013.01); *B65G 43/08* (2013.01); *B65G 47/14* (2013.01); *B65G 2203/0233* (2013.01); *B65G 2203/041* (2013.01)

(58) Field of Classification Search
None
See application file for complete search history.

(56) References Cited

U.S. PATENT DOCUMENTS

| | | | |
|---|---|---|---|
| 3,864,618 A * | 2/1975 | Hammond | G05D 19/02 318/807 |
| 5,486,151 A | 1/1996 | Bergmann et al. | |
| 6,675,955 B2 * | 1/2004 | Nasser-Moghaddassi | ................... B65G 27/24 198/769 |
| 7,028,829 B2 | 4/2006 | Buchi | |
| 7,998,669 B2 * | 8/2011 | Deppermann | G01N 1/08 47/14 |

(Continued)

FOREIGN PATENT DOCUMENTS

| | | | | |
|---|---|---|---|---|
| CN | 108421723 A | * | 8/2018 | ............... B07C 5/00 |
| CN | 108421723 A | | 8/2018 | |

(Continued)

*Primary Examiner* — Kavel Singh
(74) *Attorney, Agent, or Firm* — Brian Roffe

(57) ABSTRACT

According to one method, bulk materials are conveyed in a metered quantity on at least one plate element and are lifted up from the plate element in order to organize the bulk materials by a movement oriented approximately perpendicularly to the plate element. The plate element is moved up and down at least transversely to the plate element support surface by at least one pulse, preferably two successive pulses, such that the bulk materials located on the plate element are lifted up from the plate element for a short time during each pulse, thus allowing an efficient and highly productive conveyance of the bulk materials.

20 Claims, 3 Drawing Sheets

(56) References Cited

U.S. PATENT DOCUMENTS

| | | | |
|---|---|---|---|
| 8,028,469 B2* | 10/2011 | Deppermann | G01N 1/04 47/14 |
| 10,973,174 B2* | 4/2021 | Bovée | B07C 5/36 |
| 10,999,978 B2 | 5/2021 | Bovee | |
| 2016/0039614 A1 | 2/2016 | Bott et al. | |
| 2019/0039614 A1* | 2/2019 | Nagata | B60W 10/20 |
| 2020/0306996 A1 | 10/2020 | Kieffer et al. | |
| 2021/0162610 A1 | 6/2021 | Kieffer et al. | |

FOREIGN PATENT DOCUMENTS

| | | |
|---|---|---|
| DE | 102015204501 A1 | 9/2016 |
| EP | 2664421 B1 | 10/2017 |
| WO | 2021053176 A2 | 3/2021 |

* cited by examiner

Fig. 7
Fig. 8
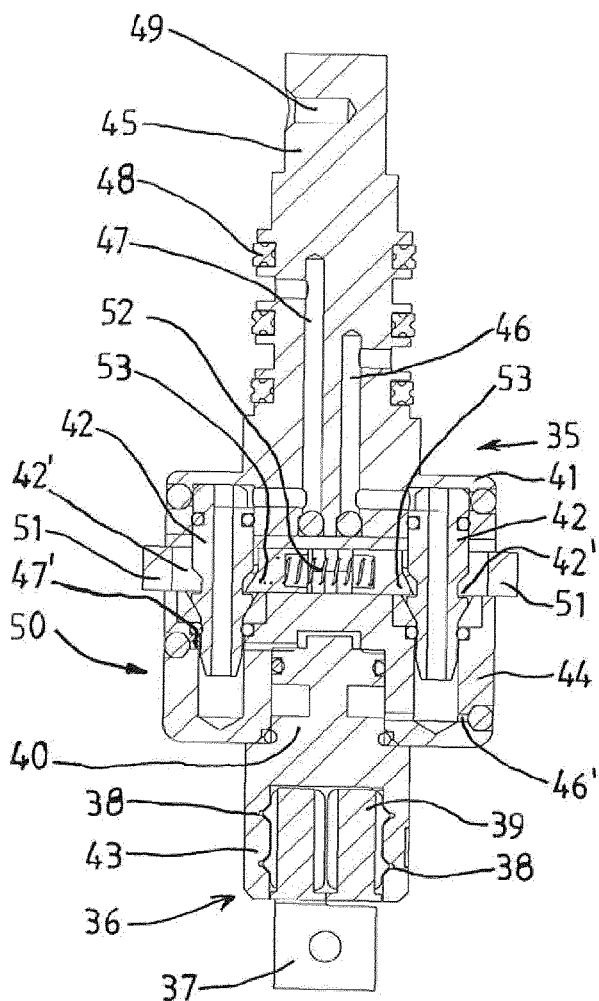
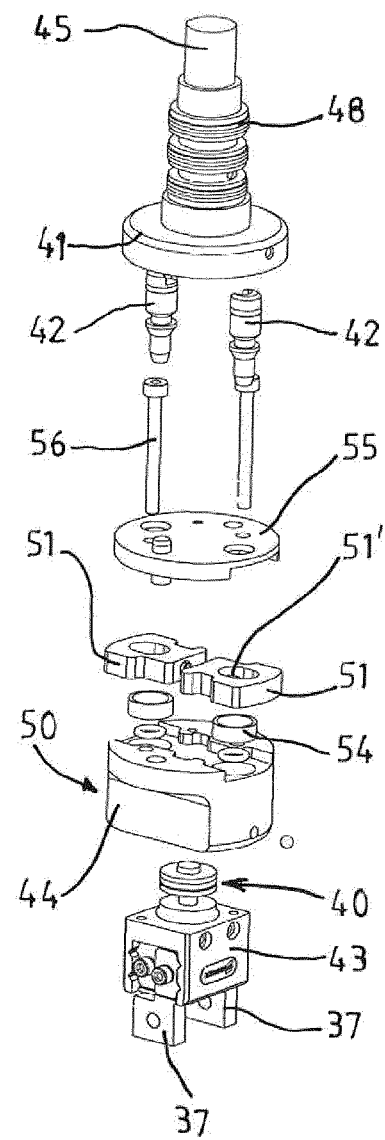

DEVICE FOR CONVEYING BULK MATERIALS

FIELD OF THE INVENTION

The invention relates to a method for conveying bulk materials, wherein the bulk materials are conveyed in a metered quantity on at least one plate element, and are lifted up from the plate element in order to organize the bulk materials by means of a movement oriented approximately perpendicular to this plate element, and a device for carrying out the method.

BACKGROUND OF THE INVENTION

With a method according to the printed publication EP-A-1 513 749, which corresponds to U.S. Pat. No. 7,028,829, for the conveying of bulk materials, these materials are conveyed from a plurality of bulk materials, arranged above one another in a storage device, into an individually distributed and orderly position within the gripping range of a robot. With one device, a horizontally-arranged oscillating conveying surface is provided with means for moving the bulk materials in a forwards or backwards movement in the x-direction and y-direction respectively, and also means for initiating an oscillation of the oscillating conveying surface in the z-direction. A camera and a sensor are provided for the individual detection of the number, position, and orientation of the individually separated bulk materials. A processor serves to process the sensor signals and to generate control commands, including an oscillating movement in the x-direction with programmable amplitudes continually increasing in the x-direction. The oscillating movement in the z-direction takes place in an alternating manner, or at least partially simultaneously and co-ordinated with a forwards or backwards conveying of the bulk materials in the x-direction and y-direction. All the movements of the oscillating conveying surface are stopped at least for taking a momentary image by the camera until the removal of bulk materials by the robot, in order to determine the positions of the materials.

With this method, bulk materials can be moved in different directions and distributed in an orderly and individual manner on the oscillating conveying surface, such that they can be taken up individually by a robot and laid on a separate location. This method and the device used for it are, however, relatively elaborate in their handling, and they are also not particularly effective in capacity with regard to the quantity conveyed.

OBJECTS AND SUMMARY OF THE INVENTION

Conversely, the invention is based on the object of further developing a method and a device in accordance with the generic type referred to in the preamble, in such a way that, with a relatively simple and compact structural design, a more efficient and more productive conveying of bulk materials becomes possible.

This object may be solved according to the invention by a method in which a plate element is moved up and down at least transversely to its contact surface by means of at least one pulse, and preferably by two sequential pulses, such that bulk materials located on the plate element are lifted up from the plate element for a short time during each pulse. This object may also be solved by a device including a plate element supported on at least one electromagnetically operating adjustment mechanism, which is configured such that two pulses are generated with it, wherein this adjustment mechanism is connected to an electronic control device for the adjustment and carrying out of the pulse movements.

With this method according to the invention, the plate element is moved up and down at least transversely to its support surface for the bulk materials by at least one pulse and preferably two sequential pulses, such that the bulk materials located on the plate element are lifted up from the plate element for a short time during each pulse, thus allowing for a rapid and efficient individual placement of the materials on the plate element, and such that these materials are easily located and their position on the plate element can be easily and reliably detected. Following this, the manipulator can be actuated accordingly, and its grippers can take up the materials and lay them in a specific position next to the device.

It has surprisingly transpired that a distribution of the bulk materials on the plate element for their detection can be achieved extremely rapidly and reliably if, in particular, two sequential pulses are initiated, with the time interval between the two pulses being selected in such a way that the bulk materials, located on the plate element, are lifted from it, immediately after the first pulse, by the second pulse.

Very advantageously, the plate element is configured to be at least transparent to view, such that the outer contours of the bulk materials located above the plate element can be photographically detected from beneath after the pulses have taken place, and from this the x-co-ordinates and y-co-ordinates of the respective positions and their orientation can be determined, and serve as position values for a gripper of the manipulator. In this way, a camera, a line scanner, or the like can be integrated in the device according to the invention in a very spatially economical manner, and the respective positions of the materials can be easily detected.

Purposefully, the pulse movements on the plate element are generated by at least one electromagnetically functioning adjustment mechanism, with which the adjustment lift amounts to approximately 0.1 to several millimeters, and this takes place at a respective pulse duration of fractions of a second.

BRIEF DESCRIPTION OF THE DRAWINGS

The invention and further advantages of it are explained in greater detail hereinafter on the basis of exemplary embodiments, and making reference to the drawings. The Figures show:

FIG. 7 is a longitudinal section of a gripper for the device according to the invention according to FIG. 1; and FIG. 8 is a perspective exploded view of the gripper according to FIG. 7.

DETAILED DESCRIPTION OF THE INVENTION

Figure 1:
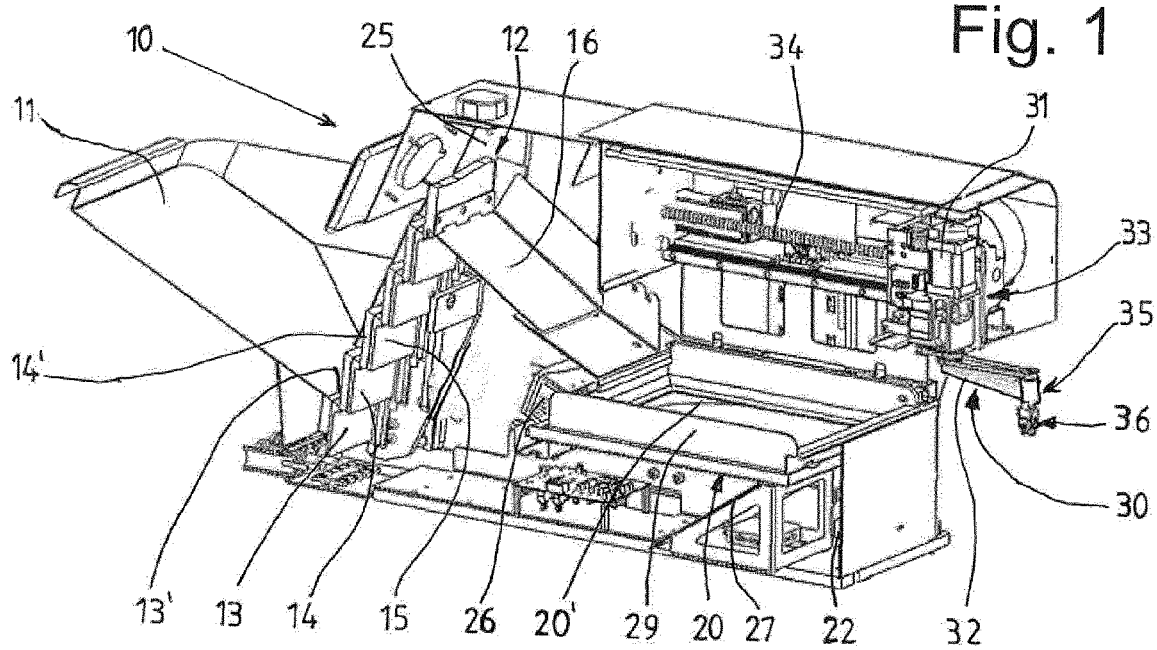
FIG. 1 is a device according to the invention in a perspective view, with a longitudinal section of its housing.

The device 10 shown in FIG. 1 is provided with a filling container 11, accessible from the side, for receiving bulk materials. The bulk materials can be of different types, such as supply parts for the automated assembly of machines, devices, machine components, or the like, or parts which are introduced into or moved out of processing machines, such as punching, milling, drilling, or similar machines. For example, with an automatic circular cyclic device, nests which are emptied as the cycle progresses can be fed again with such parts. In principle, these can likewise be parts for packaging machines, such as, for example, in the sectors of food, medicine, pharmaceuticals, or the like. Applications are also possible for the loading of processing machines, such as injection moulding machines.

This device 10 comprises a multi-part housing 25, its filling container 11, a conveying device 12 interacting with this, a plate element 20, at least one manipulator 30, with an adjustable gripper 35 above the plate element 20 with a pivot arm 32, and an electronic control unit, not shown in greater detail, for the automated conveying of the bulk materials in the device.

With the exemplary embodiment shown, this conveying device 12 takes the form of a plate conveyor, arranged on which are a plurality of plates 13, 14, 15, 13', 14', running obliquely upwards, which are arranged with their side surfaces arranged stepped parallel to one another. These plates 13,14,15 can be moved independently of one another up and down in an oscillating manner in their longitudinal extension, and thereby allow for a stepped metered conveying of bulk material parts on their upper sides, from the filling container 11 as far as the overflow and a ramp 16, leading obliquely downwards, which extends as far as the upper side of the plate element 20.

Such a plate conveyor is inherently known, and it is therefore not considered in any greater detail. This offers the advantage that, by way of this arrangement, space can be spared with this stepped conveying technique, and the device 10 can accordingly be constructed in a more compact manner, and, in addition, the bulk materials 21 can be conveyed cyclically from the filling container 11, rapidly and individually or in small numbers. The inclination angles of the plates 13, 14, 15, 13', 14' can also be optimally adjusted depending on the shape and size of the materials.

Figure 2:
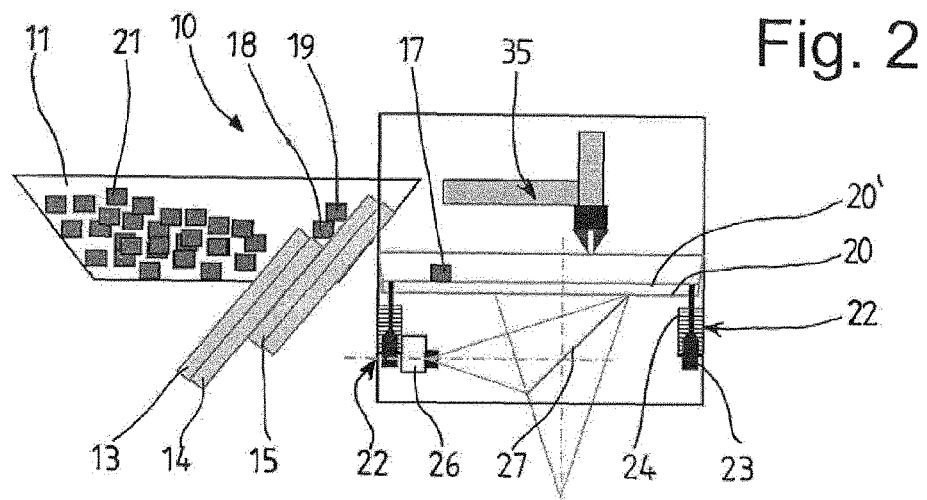
FIG. 2-6, in each case, is a principle schematic representation of the device according to the invention, with the individual steps of the method for conveying bulk materials.
Figure 3:
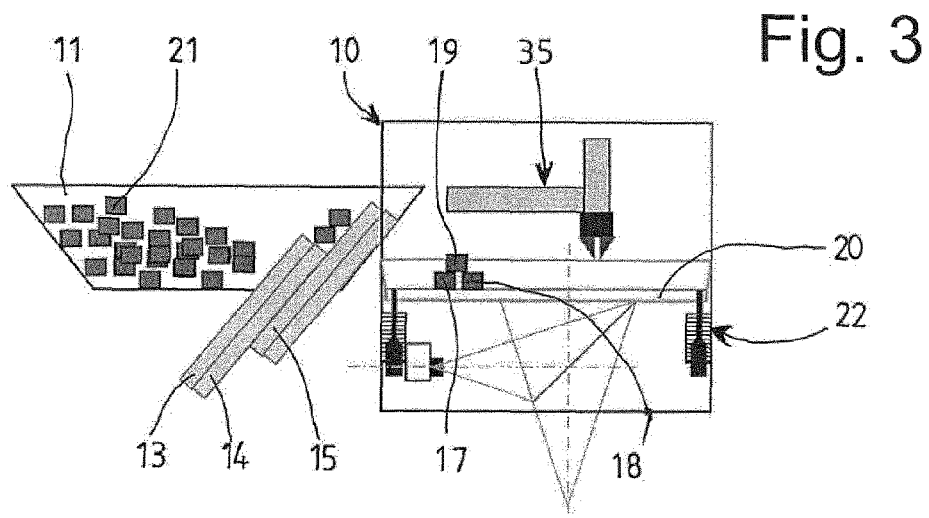

According to FIG. 2 and FIG. 3, these bulk materials 17, 18, 19 are conveyed one after another via this ramp 16, and usually lie next to and on top of one another on the plate element 20, without a specific alignment.

Figure 4:
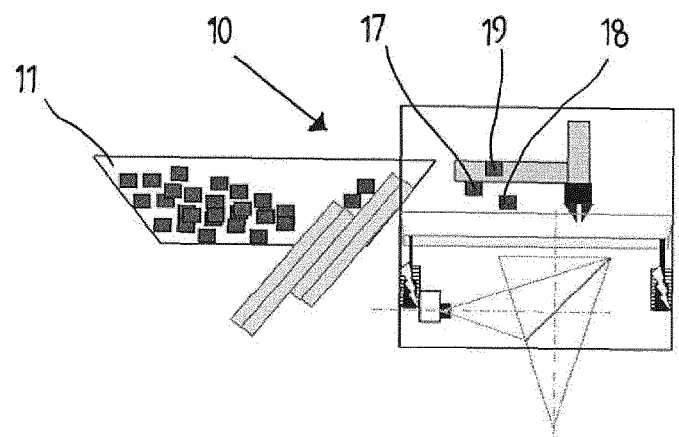

With the method according to the invention, the plate element 20 according to FIG. 4 is moved up and down at least transversely to its contact surface 20' by at least one pulse, and preferably by two sequential pulses, such that the bulk materials 17, 18, 19 located on the plate element 20 are lifted from it for a short time during each pulse, as can be seen schematically.

Very advantageously, with two sequential pulses, a time interval is selected between the two pulses such that the bulk materials 17, 18, 19, immediately after the first pulse, that on after landing on the plate element 20 they are lifted up off the plate element 20 again by the second pulse.

Figure 5:
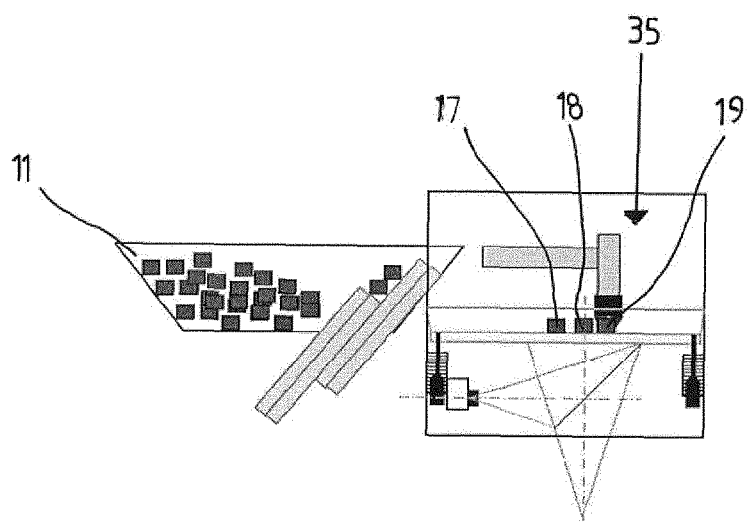

With such a control arrangement of the pulsed upwards and downwards movements of the plate element 20, it is possible to achieve, within a very short space of time of less than one second, a reliable orientation of the materials 17, 18, 19, as represented in FIG. 5.

The lifting and the pulse duration of the movements of the plate element 20 at each pulse are determined as a dependency at least of the weight and preferably of the outer shape of the bulk materials 17, 18, 19.

Figure 6:
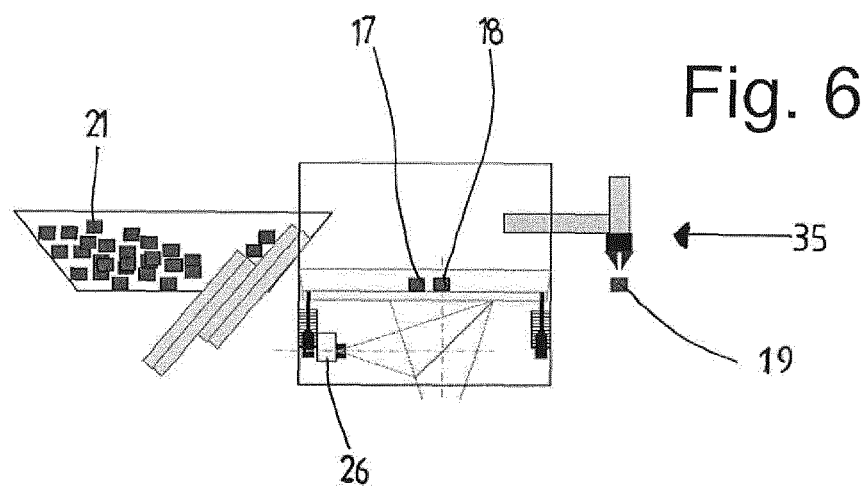

The adjustment and performance of the pulse movements of the plate element 20 take place by means of an electronic control device, which is configured preferably in the form of a processor in a computer integrated into the device 10, with a display and keyboard and provided with a suitable software program. With this control device, the necessary parameters can be input, and the bulk materials can be guided fully automatically to the correct deposit position outside the device, as shown in FIG. 6 with the item 19 deposited by the gripper 35.

The generating of the pulse movement, or preferably two pulse movements, takes place by an electromagnetic adjustment mechanism 22, with which the adjustment stroke movement amounts to approximately 0.1 to several millimeters, and this is carried out cyclically at each pulse duration of fractions of a second.

The plate element 20 in the illustrated embodiment has four corners and is supported at its four corners in each case by an adjustment mechanism 22. Each adjustment mechanism 22 consists of a lifting bolt 23, guided on the outside of the plate element 20, and, surrounding the lifting bolt 23, a magnetic coil 24, which is subjected to electric current in order to move the plate element 20 upwards in a pulsed manner with a lifting movement in a direction transverse to its contact surface 20', the plate element 20 then lowering again, when the current flow is disconnected, due to its own weight, into the starting position. The respective adjustment mechanism 22 is connected to the electronic control device for the adjustment and for carrying out the pulse movements. Advantageously, the lifting bolt 23, after the accelerated movement upwards, strikes against an upper stop element, such that it, and therefore the plate element 20, are stopped abruptly, and therefore the raising of the parts is additionally advantaged.

It is therefore to the purpose that the bulk materials 17, 18, 19, after the short lifting movement incurred by the pulses, lie next to one another on the plate element 20 and not on top of one another. In addition, a frame 29 is also arranged above the plate element 20, by means of which the parts are prevented from falling downwards at the side.

In these positions, the aligned bulk materials 17, 18, 19 are then photographically detected, and their x-co-ordinates and y-co-ordinates in relation to their centres of gravity, or a reference point, and their orientation on the plane formed by the contact surface 20' of the plate element 20, are detected and then evaluated and stored by the control unit.

According to the invention, the plate element 20 is configured as at least transparent or as entirely see-through, such that the bulk materials 17, 18, 19 located on it can be detected by a camera 26, via a reflector 27 interacting with it, underneath the plate element 20. Due to this transparent or see-through configuration of the plate element 20, the camera 26 can detect at least the under sides of the materials 17, 18, 19 by a picture, by means of which their location position can be determined in each case in relation to the x-co-ordinates and y-co-ordinates, and, if required, the z-co-ordinates, as well as the orientation of the plane formed by the plate element.

This reflector 27, provided as a mirror, is secured in the housing 25, underneath the plate element 20 and at an angle to it, and is arranged in relation to the camera 26, placed laterally at the plate element 20, in such a way that one or more digital images are taken as close as possible to from a direction perpendicular to the plate element 20 from underneath the plate element 20, such that from the obtained digital images, the x-coordinates and y-coordinates and the orientation of the materials can be determined precisely.

As can be seen in FIG. 1, the manipulator 30 comprises a guide head 33, mounted in the housing 25 in the longitudinal and vertical direction, and integrated in this a controllable rotary motor 31 for the pivotable gripper 35, which can be moved parallel to the plate element 20. In this situation, the guide head 33 is mounted so as to be moved by a guide rod 34, which is preferably configured as a threaded spindle, laterally above the plate element 20 inside the housing 25.

The pivotable gripper 35 of the manipulator 30 can therefore, on the one hand, be moved by the guide head 33 along the plate element 20, and due to its pivoting capability can be brought into any desired position above the plate element 20, and, on the other hand, can be moved into a specific position next to the plate element 20 for the positioning of the bulk materials 17, 18, 19 for further processing or for depositing in a box or the like, as is shown in FIG. 6.

With the arrangement of the manipulator 30 and its gripper 35 laterally above the plate element, an optimum spatial arrangement is achieved together with the camera 26 and the reflector 27 underneath the plate element 20 and the conveying device 12 to the side of the plate element 20.

The manipulator 30, and therefore the gripper 35, are actuated accordingly by the electronic control device, and guided into the photographically detected position of the bulk materials 17, 18, 19, such that the gripper 35 takes up a respective item by gripper fingers or by a suction pad or the like, and then conveys it to the depositing position. The determination of the x-co-ordinates and y-co-ordinates, and, if required, the z-co-ordinates, and the orientation of the materials, takes place in such a way that the gripper 35 is correctly positioned and its gripper fingers grip the respective item on the outside, and do not project upwards on the item.

FIG. 7 and FIG. 8 show a gripper 35, which can be mounted at the manipulator 30, which is composed of a gripper part 36 with two gripper chucks 37, which can be moved against one another, an actuating piston 40, a guide unit 50 with engagement means 51, and a shaft 45 with two connection holes 46, 47. In this situation, the shaft 45 of the gripper 35 can be securely mounted on the pivot arm 32, and the connection holes 46, 47 are connected to corresponding holes in the pivot arm 32, which lead to a pressure medium, not shown, with a valve control.

This shaft 45 is also provided with a transverse centre hole 49 as centring means, in order for the gripper to be mounted in a specific rotation position. Secured at its circumference on both sides to the radially emerging connection holes 46, 47, are a plurality of sealing rings 48, and secured at the lower end of the shaft is a hub 41, with preferably two engagement sleeves 42 projecting downwards.

According to the invention, these engagement sleeves 42 interact with the engagement means 51 of the guide unit 50 in such a way that, on the actuation of the engagement means 51, the guide unit 50, together with the actuation piston 40 and the gripper part 36 are coupled to the shaft 45, and, respectively, by pressing the radially movable engagement means 41 inwards, are released from it.

For this purpose, the disk-shaped engagement means 51 are pressed radially apart from one another by means of a spring element 52 arranged between them in the cylinder head 44, and the engagement sleeves 42 each project through a transverse opening 51' in the engagement means 51. In this coupled state, the engagement means 51 each engage with a cam 53 in a ring-shaped slot 42' of the engagement sleeve 42. When the engagement means 51, projecting laterally at the cylinder head 44, are manually pressed together, these cams 53 are moved out of the slots 42', and the cylinder head 44 of the guide unit 50 can be moved away from the shaft 45.

Shown in FIG. 8 is the outer shape of the disk-shaped engagement means 51, and their securing in the cylinder head 44 by means of sealing disks 54, and a cover 55 with securing screws 56.

Accordingly, within the framework of the invention an easily handled quick-change system for the gripper part 36 is created, by means of which, depending on their shape, the bulk materials can be secured and conveyed by a corresponding gripper part 36, with suitable gripper chucks 37 or the like. This can therefore involve finger grippers, magnetic grippers, angled grippers, perforated grippers, parallel grippers, centric grippers, or other similar types, but also suction pads. By means of this changeable guide unit 50, it is in any event possible for the gripper part 36 to be exchanged extremely easily, and, if required, replaced by another one.

At the gripper part 36, the gripper chucks 37, which can be moved opposite one another in longitudinal guides 38, are mounted in a housing head 43, and they are likewise moved and positioned by the actuation piston 40, likewise in the housing 43, which can be moved to and fro in the guide unit 50 in the axial direction of the gripper by means of a deflection element, such as a wedge hook. Such gripper parts 36 are inherently known, and are therefore not considered in any greater detail.

The actuation piston 40 is moved by this pressure medium, such as by compressed air, by the valve control. The connection holes 46, 47 in the shaft 45 extend through the engagement sleeves 42 and through transverse holes 46', 47' in the cylinder head 44 of the guide unit 50. By the introduction of the pressure medium through one or another of the transverse holes 46', 47', the actuation piston 40 is moved inwards or outwards. The housing 43, with the gripper chucks 37, is in this situation secured centrally at the cylinder head 44.

This gripper 35 could of course be configured in a different manner to that shown. For example, it would be possible for only one engagement sleeve 42 and one engagement means 51 to be provided, which could interact functionally in the same manner or differently, such as, for example, by a rotational movement of the engagement means 51. The shaft 45 and the connection holes 46, 47 could also be shaped differently.

Advantageously, a measuring element, not shown, is arranged in the manipulator 30 or in the housing 25, by means of which a check can be carried out as to whether the gripper 35 has effectively taken up a bulk material and deposited it.

Advantageously, only a limited number of bulk materials 17, 18, 19, preferably between 3 and 10 parts, are conveyed in a discontinuous manner by the conveying device 12 onto the plate element 20. Depending on the application, it would in principle be possible for the materials also to be conveyed almost continuously onto the plate element 20. It would then accordingly be necessary for the distribution by the pulses and the taking up of the materials to be matched to one. As soon as these materials 17, 18, 19 are aligned on the plate element 20 by the at least one pulse, they are then taken up by the manipulator 30 and removed, and this is then repeated until a specific number of materials have been deposited next to the plate element, or materials are deposited continually.

For safety reasons the device 10 is surrounded by the housing 25, and is not accessible from the outside when in operation.

The invention has been adequately described by the exemplary embodiment explained heretofore. It could of course also be explained by further variants. It would be possible, for example, for more than one manipulator to be provided, for example one each on both sides above the plate element, in order almost to double the conveying capacity.

With regard to the conveying device, it would of course also be possible, instead of a plate conveyor, to make use of a conveyor belt, running flat or obliquely upwards, a vibrating conveyor, or the like. The plate element could also be supported by only one or two adjustment mechanisms.

It would be possible, instead of a camera, for a line scanner, a scanner, or the like to be integrated in the device according to the invention, and detect and locate the respective positions of the materials. Such a scanner could be put into effect beneath the plate element as a carriage moving to and fro, with corresponding measurement sensors.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. Device for conveying bulk materials, comprising:
   a plate element having a contact surface onto which bulk materials are conveyed,
   an adjustment mechanism that supports the plate element and operatively generates pulses, the plate element being moved at least in a direction transverse to the contact surface by means of at least one pulse generated by the adjustment mechanism, whereby bulk materials on the plate element lift up from the plate element during each of the at least one pulse,
   an electronic control device connected to the adjustment mechanism and configured to control generation of pulses by the adjustment mechanism, and
   a manipulator configured to manipulate bulk materials when on the plate element and convey the bulk materials from the plate element, the manipulator comprising a movable guide head above the plate element, a pivotable gripper above the plate element and coupled to the guide head to thereby move upon movement of the guide head, and a motor that operates to cause the gripper to pivot parallel to the plate element.

2. Device according to claim 1, wherein the adjustment mechanism comprises four lifting bolts supporting the plate element, and magnetic coils surrounding the lifting bolts, the magnetic coils being operatively subjected to electric current in order to lift the lifting bolts and therefore the plate element.

3. Device according to claim 1, further comprising a filling container for receiving bulk materials, and a conveying device interacting with the filling container to receive bulk materials from the filling container and convey the bulk materials onto the contact surface of the plate element.

4. Device according to claim 1, wherein the manipulator is arranged above the plate element, the guide head is mounted laterally above the plate element in longitudinal and vertical directions, the motor is a rotary motor and the gripper is configured to be pivotable by the rotary motor parallel to the plate element in the x-direction and y-direction.

5. Device according to claim 4, wherein the gripper of the manipulator is movable by the guide head along the plate element, and, due to its pivoting capability, is movable into any desired position above the plate element, and is also pivotable to a specific point next to the plate element in order to enable depositing of the bulk materials for further conveying from the plate element.

6. Device according to claim 1, wherein the manipulator further comprises a pivot arm connecting the gripper to the guide head and that enables pivoting of the gripper parallel to the plate element, and wherein the gripper comprises:
   a gripper part,
   a guide unit,
   an actuation piston, and
   a shaft for securing the guide unit to a pivot arm, and
   wherein the shaft comprises at least one engagement sleeve and the guide unit comprises actuatable engagement means for interacting with the engagement sleeve such that, upon actuation of the at least one engagement means, the guide unit is coupled together with the actuation piston and the gripper part with the shaft or uncoupled from the shaft.

7. Device according to claim 6, wherein the engagement means is disk-shaped and is configured to be pressed by a spring element in a cylinder head radially outwards, and the engagement sleeve projects through a transverse opening in the engagement means, and wherein the engagement means engage with a cam into a ring-shaped slot of the engagement sleeve.

8. Device according to claim 7, wherein two engagement means are arranged such that they are pressed apart radially by the spring element in the guide unit arranged between them, wherein, when the engagement means are manually pressed together, the cams are movable out of the slots of the engagement sleeves, and the guide unit is movable away from the shaft.

9. Device according to claim 6, wherein connection holes extend through the shaft, the engagement sleeve, and through transverse holes in a cylinder head of the guide unit, through which a pressure medium is conveyable in a controllable manner from a pressure source to the actuation piston, in order to move the actuation piston.

10. Device according to claim 1, wherein the plate element is transparent, the device further comprising a camera under the plate element and that photographs bulk materials when on the contact surface of the plate element.

11. Device according to claim 10, wherein from photographs of bulk materials on the plate element obtained by the camera, positions of bulk materials are detected in relation to x-coordinates and y-coordinates, and orientation of bulk materials is detected in relation to a plane formed by the plate element, the electronic control device being configured to evaluate the x-coordinates and y-coordinates of the bulk materials, and detected orientation of the bulk materials in relation to the plane formed by the plate element to provide position values for the gripper of the manipulator.

12. Device according to claim 10, further comprising a reflector under the plate element, the camera being arranged relative to the reflector to photograph bulk materials when on the contact surface of the plate element via the reflector.

13. Device according to claim 1, wherein the manipulator further comprises a pivot arm that connects the gripper to the guide head.

14. Device according to claim 1, wherein bulk materials are conveyed in a metered quantity onto the plate element, and are lifted up from the plate element in order to organize them by movements oriented in the direction transverse to the contact surface of the plate element, the adjustment mechanism being controlled by the electronic control device to generate two sequential pulses and cause the plate element to move up in the direction transverse to the contact surface of the plate element when the pulses are generated and down between the pulses.

15. Device for conveying bulk materials, comprising:
a plate element having a contact surface onto which bulk materials are conveyed, the plate element having a contact surface,
an electromagnetically operating adjustment mechanism that supports the plate element and operatively generates pulses, the plate element being moved up and down at least in a direction transverse to the contact surface by means of at least one pulse generated by the adjustment mechanism, whereby bulk materials on the plate element lift up from the plate element during each of the at least one pulse, and
an electronic control device connected to the adjustment mechanism and that controls generation of pulses by the adjustment mechanism,
the adjustment mechanism comprising a plurality of lifting bolts supporting the plate element, and a magnetic coil surrounding each of the lifting bolts, the magnetic coils being subjected to electric current in order to lift the lifting bolts and therefore the plate element.

16. Device according to claim 15, wherein the plate element has four corners and the plurality of lifting bolts consists of four lifting bolts, one at each of the four corners of the plate element.

17. Device for conveying bulk materials, comprising:
a plate element having a contact surface onto which bulk materials are conveyed, the plate element having a contact surface,
an electromagnetically operating adjustment mechanism that supports the plate element and operatively generates pulses, the plate element being moved up and down at least in a direction transverse to the contact surface by means of at least one pulse generated by the adjustment mechanism, whereby bulk materials on the plate element lift up from the plate element during each of the at least one pulse,
an electronic control device connected to the adjustment mechanism and that controls generation of pulses by the adjustment mechanism, and
a manipulator that manipulates the bulk materials when on the plate element, the manipulator comprising a gripper configured to grip bulk materials when on the plate element, and a pivot arm that enables pivoting of the gripper parallel to the plate element,
the gripper comprising:
a gripper part,
a guide unit,
an actuation piston, and
a shaft for securing the guide unit to the pivot arm,
the shaft comprising at least one engagement sleeve and the guide unit comprising actuatable engagement means for interacting with the engagement sleeve such that, upon actuation of the at least one engagement means, the guide unit is coupled together with the actuation piston and the gripper part with the shaft or uncoupled from the shaft.

18. Device according to claim 17, wherein the engagement means is disk-shaped and is configured to be pressed by a spring element in a cylinder head radially outwards, and the engagement sleeve projects through a transverse opening in the engagement means, and wherein the engagement means engage with a cam into a ring-shaped slot of the engagement sleeve.

19. Device according to claim 18, wherein two engagement means are arranged such that they are pressed apart radially by the spring element in the guide unit arranged between them, wherein, when the engagement means are manually pressed together, the cams are movable out of the slots of the engagement sleeves, and the guide unit is movable away from the shaft.

20. Device according to claim 17, wherein connection holes extend through the shaft, the engagement sleeve, and through transverse holes in a cylinder head of the guide unit, through which a pressure medium is conveyable in a controllable manner from a pressure source to the actuation piston, in order to move the actuation piston.

* * * * *